United States Patent
Vermulst

(10) Patent No.: US 9,998,016 B2
(45) Date of Patent: Jun. 12, 2018

(54) AC/DC CONVERTER WITH NEUTRAL VOLTAGE LIFT CAPACITOR

(71) Applicant: TECHNISCHE UNIVERSITEIT EINDHOVEN, Eindhoven (NL)

(72) Inventor: Bastiaan Joannes Daniël Vermulst, Eindhoven (NL)

(73) Assignee: TECHNISCHE UNIVERSITEIT EINDHOVEN, Eindhoven (NL)

( * ) Notice: Subject to any disclaimer, the term of this patent is extended or adjusted under 35 U.S.C. 154(b) by 0 days. days.

(21) Appl. No.: 15/038,032

(22) PCT Filed: Nov. 18, 2014

(86) PCT No.: PCT/EP2014/074877
§ 371 (c)(1),
(2) Date: May 19, 2016

(87) PCT Pub. No.: WO2015/075019
PCT Pub. Date: May 28, 2015

(65) Prior Publication Data
US 2016/0301319 A1    Oct. 13, 2016

(30) Foreign Application Priority Data

Nov. 21, 2013 (NL) ...................... 2011825

(51) Int. Cl.
*H02M 3/335* (2006.01)
*H02M 5/293* (2006.01)
(Continued)

(52) U.S. Cl.
CPC ......... *H02M 3/33538* (2013.01); *H02M 1/08* (2013.01); *H02M 1/12* (2013.01);
(Continued)

(58) Field of Classification Search
CPC ............ H02M 1/08; H02M 1/12; H02M 1/42; H02M 2001/007; H02M 3/33538; H02M 5/293; H02M 7/217
See application file for complete search history.

(56) References Cited

U.S. PATENT DOCUMENTS

2012/0262966 A1* 10/2012 Luerkens .............. H02M 7/066
                                                               363/127
2013/0028623 A1*  1/2013 Inukai .................. G01R 19/175
                                                                399/69
(Continued)

FOREIGN PATENT DOCUMENTS

WO     2008018802 A2     2/2008

OTHER PUBLICATIONS

Mishima et al, Three Wire Electric Circuit Voltage Detection Device, May 21, 1999, JPO, JP H11-133065A, figure 1. CD.*
(Continued)

*Primary Examiner* — Adolf Berhane
*Assistant Examiner* — Bart Iliya
(74) *Attorney, Agent, or Firm* — Kenealy Vaidya LLP

(57) ABSTRACT

Some embodiments are directed to an AC/DC converter comprising a first AC terminal for connection to a first AC circuit terminal, a neutral line terminal for connection to a neutral AC circuit terminal, a common node, a first AC side active bridge coupled between the first AC terminal and the common node, and a neutral voltage lift capacitor coupled between the neutral line terminal and the common node. The converter comprises first and second DC terminals, and a capacitor between the first and second terminals. A DC-side active bridge is coupled between the first and second terminals. An inductor is coupled between switchable nodes of the first AC side active bridge and the DC side active bridge. A controller is arranged to control the first AC side active
(Continued)

bridge and the DC-side active bridge so to alternate voltage across the first AC terminal and the neutral line terminal.

4 Claims, 4 Drawing Sheets

(51) Int. Cl.
    *H02M 7/217*     (2006.01)
    *H02M 1/08*     (2006.01)
    *H02M 1/12*     (2006.01)
    *H02M 1/42*     (2007.01)
    *H02M 1/00*     (2006.01)

(52) U.S. Cl.
    CPC ............ *H02M 1/42* (2013.01); *H02M 5/293* (2013.01); *H02M 7/217* (2013.01); *H02M 2001/007* (2013.01)

(56) References Cited

U.S. PATENT DOCUMENTS

| | | | |
|---|---|---|---|
| 2013/0051102 A1 | 2/2013 | Huang et al. | |
| 2013/0201733 A1* | 8/2013 | Divan | H02M 1/00 363/39 |
| 2013/0301323 A1* | 11/2013 | Iyasu | H02M 7/797 363/123 |

OTHER PUBLICATIONS

International Search Report and Written Opinion issued in International Application No. PCT/EP2014/074877.

* cited by examiner

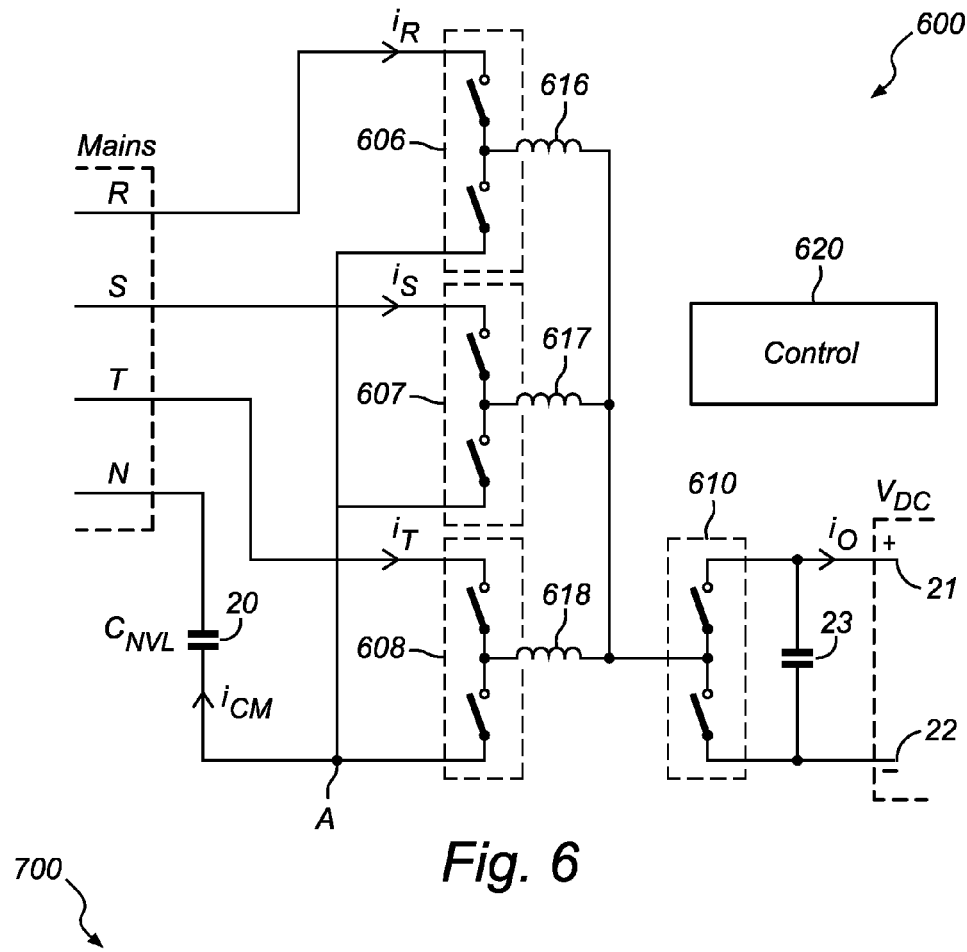
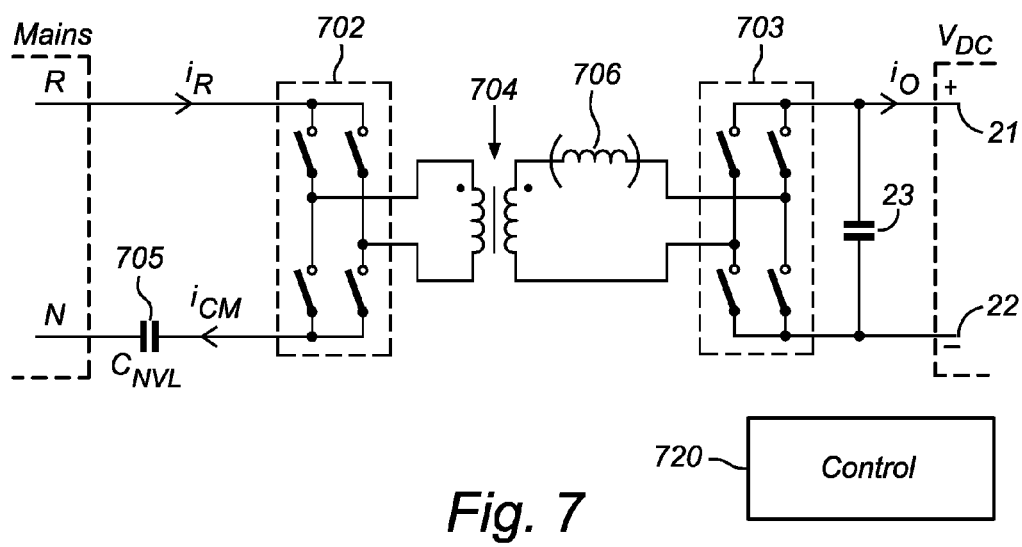
Fig. 6
Fig. 7

AC/DC CONVERTER WITH NEUTRAL VOLTAGE LIFT CAPACITOR

CROSS REFERENCE TO RELATED APPLICATION

This application is a National Phase filing under 35 C.F.R. § 371 of, and claims priority to, International PCT patent application No.: PCT/EP2014/074877, filed on Nov. 18, 2014, which claims priority to Netherland patent application No.: 2011825, filed on Nov. 21, 2013, the contents of each of which are hereby incorporated in their entireties by reference.

FIELD OF THE INVENTION

The invention relates to the field of AC to DC converters, and more specifically to bi-directional AC/DC converters.

BACKGROUND ART

Sustainable energy and innovation are one of the highest priority items of present modern societies. Here, solar energy and wind power are important, as well as the electrification cars. When looking at the overall image, the modern society must become more electrified to overcome issues with, among others, air pollution and global warming.

This electrification will require high-performance power converters to allow for example electric cars to charge, solar panels and windmills to deliver energy to the grid, and electric motors to operate. All of these generate or consume a large amount of power. In case of the electric car battery charger and the electric motor, power can flow in both directions: regenerating kinetic energy to electric power while braking and degenerating electric energy to kinetic energy while accelerating. To ensure safety and low leakage currents, isolation between energy sources can be desired.

Current state-of-the-art AC/DC converters for such applications require a large amount of inductive energy storage and often have a two-stage design with an intermediate high-voltage bus. This high-voltage bus increases the voltage rating of the devices and requires a high voltage-rating for the bus capacitance. Furthermore, balancing the power flow between both stages can be problematic.

SUMMARY OF THE INVENTION

The aim of the present invention is to provide an AC/DC converter that solves at least one of the problems of the state of the art mentioned above. This is aim reached by providing a bi-directional AC/DC converter comprising:
  a first AC terminal for connection to a first AC circuit terminal;
  a neutral line terminal for connection to a neutral AC circuit terminal
  a common node;
  a first AC side active bridge coupled between the first AC terminal and the common node;
  a neutral voltage lift capacitor coupled between the neutral line terminal and the common node;
  a first DC terminal;
  a second DC terminal;
  a buffer capacitor arranged between the first DC terminal and the second DC terminal;
  a DC-side active bridge coupled between the first DC terminal and the second DC terminal;
  a first inductor coupled between a switchable node of the first AC side active bridge and a switchable node of the DC side active bridge;
  a controller arranged to control the first AC side active bridge and the DC-side active bridge so that an alternating voltage across the first AC terminal and the neutral line terminal is converted to and from a direct voltage across the first DC terminal and the second DC terminal.

In an embodiment the bi-directional AC/DC converter further comprises a first transformer coupled between the first AC side active bridge and the DC-side active bridge so as to electrically isolate the first AC side active bridge from the DC-side active bridge.

In an embodiment the bi-directional AC/DC converter further comprises:
  a second AC terminal for connection to a second AC circuit terminal;
  a second AC side active bridge coupled between the second AC terminal and the common node;
  a second inductor coupled between a switchable node of the second AC side active bridge and the switchable node of the DC side active bridge (610);
  a third AC terminal for connection to a third AC circuit terminal;
  a third AC side active bridge coupled between the third AC terminal and the common node,
  a third inductor coupled between a switchable node of the third AC side active bridge and the switchable node of the DC side active bridge;
  the controller being arranged to control the first AC side active bridge, the second AC side active bridge, the third AC side active bridge and the DC-side active bridge so that a three-phase alternating voltage at the first, second and third AC terminal is converted to and from the direct voltage across the first DC terminal and the second DC terminal.

In an embodiment the bi-directional AC/DC converter further comprises:
  a first transformer coupled between the first AC side active bridge and the DC-side active bridge so as to electrically isolate the first AC side active bridge from the DC-side active bridge;
  a second transformer coupled between the second AC side active bridge and the DC-side active bridge so as to electrically isolate the second AC side active bridge from the DC-side active bridge;
  a third transformer coupled between the third AC side active bridge and the DC-side active bridge so as to electrically isolate the third AC side active bridge from the DC-side active bridge.

In an embodiment, the bi-directional AC to DC converter comprises a further inductor arranged in series with a DC side coil of the first transformer.

BRIEF DESCRIPTION OF THE DRAWINGS

These and other aspects of the invention are apparent from and will be elucidated with reference to the embodiments described hereinafter. In the drawings, FIG. 1 schematically shows a state of the art topology of an isolated and bidirectional AC/DC converter;

FIG. 6 schematically shows a bi-directional AC/DC converter according to a further embodiment;

FIG. 7 schematically shows a bi-directional AC/DC converter according to yet a further embodiment.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
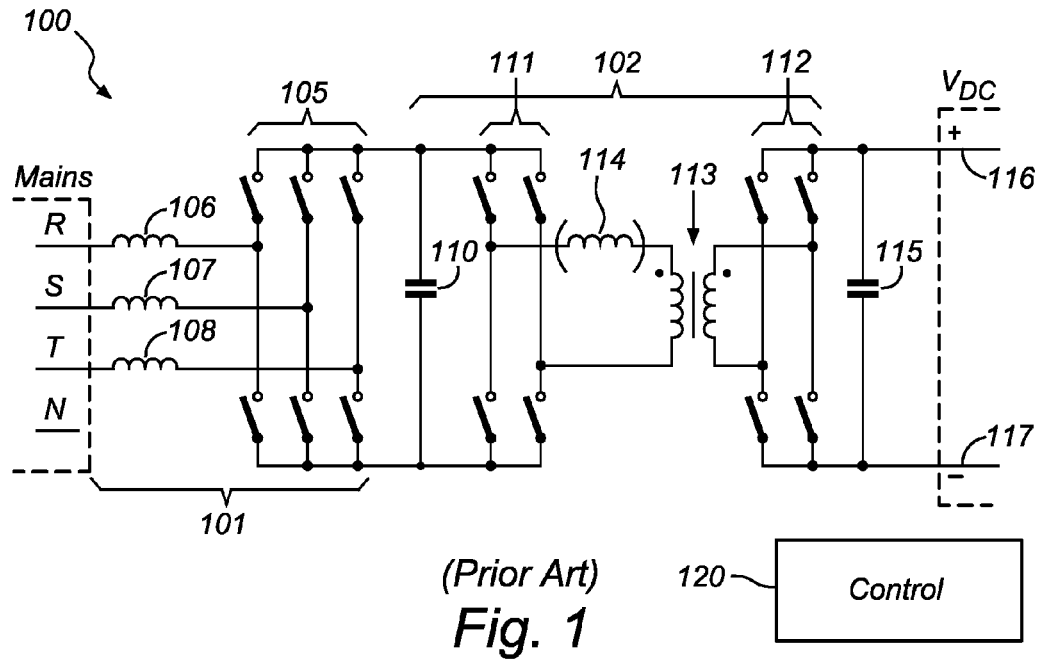

FIG. 1 schematically shows a state of the art topology of an isolated and bidirectional AC/DC converter 100. The AC/DC converter 100 comprises a voltage-boosting power factor correction (PFC) circuit 101 followed by a dual active bridge (DAB) isolation stage 102. At the AC side the converter comprises four terminals R, S, T and N. Each of the terminals R, S, T is connected to an active bridge 105 via an associated inductor 106,107,108. A buffer capacitor 110 is arranged to store energy. The DAB 102 comprises two active bridges 111,112 on both sides of a transformer 113. FIG. 1 also shows an inductor 114 which is drawn between bracket indicating that this inductor is optional. At the DC side the circuit also comprises a further capacitor 115 arranged between the DC terminals 116, 117. The active bridges are controlled by a controller 120. The controller 120 will switch the switches of the active bridges 105, 111, 112 in such a way that the AC voltage at the terminal R,S,T are converted into a DC voltage at the DC terminals 116 and 117. The controller is also arranged to convert the DC voltage across terminals 116, 117 to an AC voltage at the AC terminals.

The first stage, left from the buffer capacitor 110, rectifies the three-phase AC voltages to a stable DC voltage. Because three boost-converters are used, the DC-voltage must normally be higher than the peak-peak input voltage. Therefore, the capacitor voltage of buffer capacitor 110 is typically equal to or higher than 700V.

Furthermore, the state-of-the-art AC/DC converter 100 requires a large amount of inductive energy storage and has a two-stage design with an intermediate high-voltage bus. This high-voltage bus increases the voltage rating of the converter and also requires a high voltage-rating for the buffer capacitor 110. The converter 10 of FIG. 1 has at least 14 switches, and 4 inductors.

Figure 2:
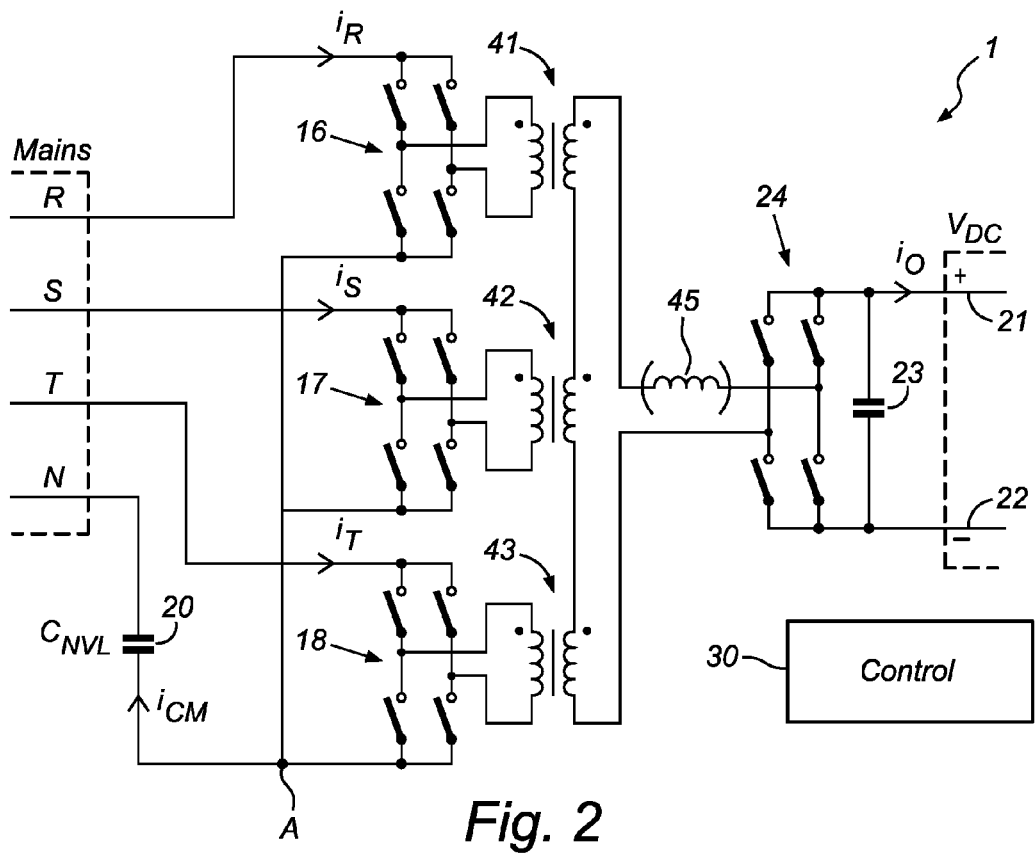
FIG. 2 shows a bi-directional AC/DC converter according to an embodiment of the invention.

FIG. 2 shows a bi-directional AC/DC converter according to an embodiment of the invention. The AC/DC converter 1 comprises a first AC terminal R for connection to a first AC circuit terminal, a second AC terminal S for connection to a second AC circuit terminal, and a third AC terminal T for connection to a third AC circuit terminal. It also comprises a neutral line terminal N for connection to a neutral AC circuit terminal.

A first AC side active bridge 16 is coupled between the first AC terminal R and a common node A. A second AC side active bridge 17 is coupled between the second AC terminal and the common node A. A third AC side active bridge 18 is coupled between the third AC terminal and the common node A. Furthermore a neutral voltage lift capacitor 20 is coupled between the neutral line terminal N and the common node A. Note that the neutral voltage lift capacitor 20 is also referred to as capacitor CNVL. At the DC side, the convertor 1 comprises a first DC terminal 21, a second DC terminal 22 and a buffer capacitor 23 arranged between the first DC terminal 21 and the second DC terminal 22. A DC-side active bridge 24 is coupled between the first DC terminal 21 and the second DC terminal 22.

In this embodiment, the converter is arranged to isolate the AC side from the DC side. For this purpose the inverter also comprises a first, second and third transformer, see 41, 42, 43. The first transformer 41 is coupled between the first AC side active bridge 16 and the DC-side active bridge 24 so as to electrically isolate the first AC side active bridge 16 from the DC-side active bridge 24. The second transformer 42 is coupled between the second AC side active bridge 17 and the DC-side active bridge 24 so as to electrically isolate the second AC side active bridge 17 from the DC-side active bridge 24. The third transformer 43 is coupled between the third AC side active bridge 18 and the DC-side active bridge 24 so as to electrically isolate the third AC side active bridge 18 from the DC-side active bridge 24. The transformer coils on the DC side are connected in series. Optionally, a further inductor 45 is arranged in series with the DC side coils of the transformers 41, 42, 43. This further inductor 45 may be left out in cases where the transformers 41, 42, 43 provide sufficient inductance.

The converter also comprises a controller 30 which is arranged to control the first AC side active bridge 16, the second AC side active bridge 17, the third AC side active bridge 18 and the DC-side active bridge 24 so that a three-phase alternating voltage at the first, second and third AC terminal R, S, T is converted to and from the direct voltage across the first DC terminal 21 and the second DC terminal 22. For this purpose the controller may comprise a processor and memory to process instructions and produce control signals to the switches of the active bridges so as to properly control the active bridges.

In FIG. 2 the current through terminal R is referred to as iR, the current through terminal S is referred to as iS and the current through terminal T is referred to as iT. Furthermore, a DC side output current io is indicated and also a current iCM through the capacitor 20.

The embodiment of FIG. 2 has a novel approach to achieving AC/DC conversion which overcomes at least part of the issues of state of the art. Firstly, all three phases are isolated individually by means of an active bridge, see 16, 17, 18, and a transformer, and see 41, 42, and 43.

Furthermore, the AC phase to ground voltage is changed by means of a series capacitor (i.e. capacitor CNVL, neutral voltage lift capacitor 20). This can be done in a way that the phase to ground voltages (e.g. VR-VA) are such that they allow to be connected directly to the active bridges 16, 17, 18. There is no need for inductors between the AC terminals and the active bridges, apart maybe from filtering to reduce harmonics in order to comply with certain standards or requirements.

As can be seen from FIG. 2, the number of switches in the circuit is 16, but the number of inductors is only 1. This means that the amount of inductive energy storage can be considerably decreased as compared to the converter of FIG. 1.

Figure 3:
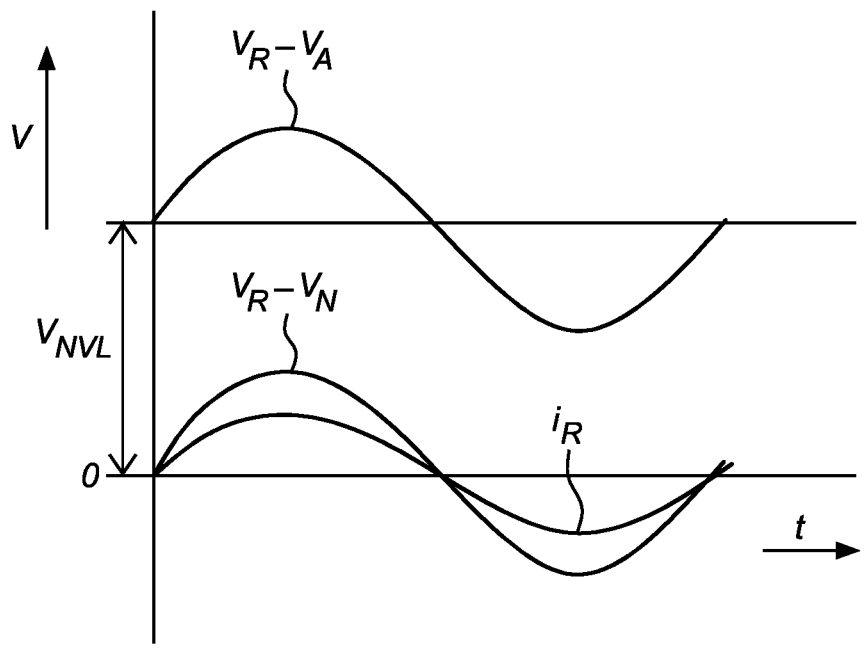
FIG. 3 shows a graph of a voltage across an active bridge, i.e. VR-VA as a function of time together with a voltage VR-VN.

FIG. 3 shows a graph of a voltage across the active bridge 16, i.e. VR-VA as a function of time together with a voltage VR-VN. Due to the created voltage across the neutral voltage lift capacitor 20, the phase to ground voltages VR-VA is always positive, which allows the direct connection of the terminal R to the active bridge 16. The switches on the input side now only have a positive terminal voltage. Half-bridge configurations typically only allow a positive terminal voltage.

In an embodiment, the controller 30 is arranged to operate all the switches in the AC/DC converter 1. The controller 30 controls a voltage across the neutral voltage lift capacitor $V_{NVL}$ by means of controlling a common-mode current of the three-phase connections, being $$i_{CM}=i_R+i_S+i_T.$$

Figure 4:
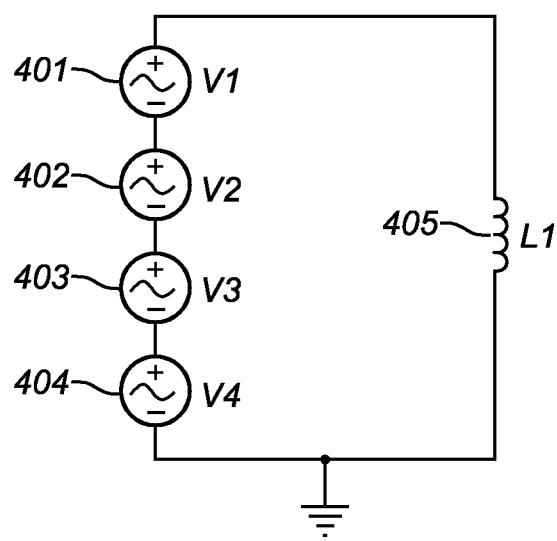
FIG. 4 schematically shows a simplified circuit model of a four-port converter.

There are various control strategies possible, one more effective than the other. One of the most simple strategies is to control the currents iR, iS, iT, and io by varying the phase shifts φn between the full bridges of each power port n, with n being R, S, T or o. Power transfer between these four ports can be found by using a simplified circuit shown in FIG. 4, which is an example of the topology with four ports. In practice, the number of ports can be increased or decreased. FIG. 4 schematically shows a simplified circuit model of a four-port converter. Each of the four ports is represented by a source ($V_1 \ldots V_n$), see voltage sources 401, 402, 403, 404. An inductor 405 having inductance L1 represent the leakage inductance Lσ in series with the transformer.

The voltage across inductor 405 is equal to the sum of the voltage of sources 401, 402, 403, 404, formulated as:

$$V_L = \Sigma V_i$$

with $$V_n = A_n \cdot e^{j\Theta_n}$$

with $A_n$ the amplitude of the voltage of source n,
$e^{j\Theta_n}$ the phase of the voltage of source n
so as to define the vector $$v = \begin{pmatrix} V_1 \\ V_2 \\ \vdots \\ V_i \end{pmatrix}.$$

By definition, the current through the inductor 405 is equal to $$I_L = \frac{V_L}{j\omega_{sw}L},$$

with $\omega_{sw}$ the switching frequency in radians per second.

From here, the power transfer matrix p can be found by using $$p = \frac{1}{\omega_{sw}L} \begin{pmatrix} A_1 A_1 \sin\phi_1 - \phi_1 & \cdots & A_i A_1 \sin\phi_i - \phi_1 \\ \vdots & \ddots & \vdots \\ A_1 A_i \sin\phi_1 - \phi_i & \cdots & A_i A_i \sin\phi_i - \phi_i \end{pmatrix},$$

where $$p = \begin{pmatrix} P_{11} & \cdots & P_{i1} \\ \vdots & \ddots & \vdots \\ P_{1i} & \cdots & P_{ii} \end{pmatrix},$$

with $P_{ab}$ the power flow from a source a to a source b.

As can be seen from matrix p, changing the phase shifts φn will influence the power flow from source to source. This matrix can be used to determine the required phase shifts φn of all voltage sources ($V_1 \ldots V_n$) with respect to their desired power flow. By changing the phase shift φn such (for instance, using PID controllers) that $i_{cm}=0$, the controller 30 is able to stabilize the voltage across capacitor CNVL. Furthermore, by controlling the current $i_{cm}$ such that $V_{NVL}$ is stable at a suitable voltage where the mains voltages (i.e. VR,VS,VT) plus voltage VNVL is always positive, the converter 1 is able to operate.

The AC/DC converter 1 described above has a number of advantages. A relatively high power factor on the AC input is achieved by accurately controlling the currents iR, iS, and iT. Furthermore only a single stage is used. There is no need for a high voltage (HV) bus or a HV buffer such as the buffer 110 shown in FIG. 1, reducing the amount of energy stored. Furthermore, a modular design is achieved allowing adding and removing ports to change the properties of the converter. The embodiment of FIG. 2 only has one single magnetic energy storage component, i.e. the inductor 45.

Figure 5:
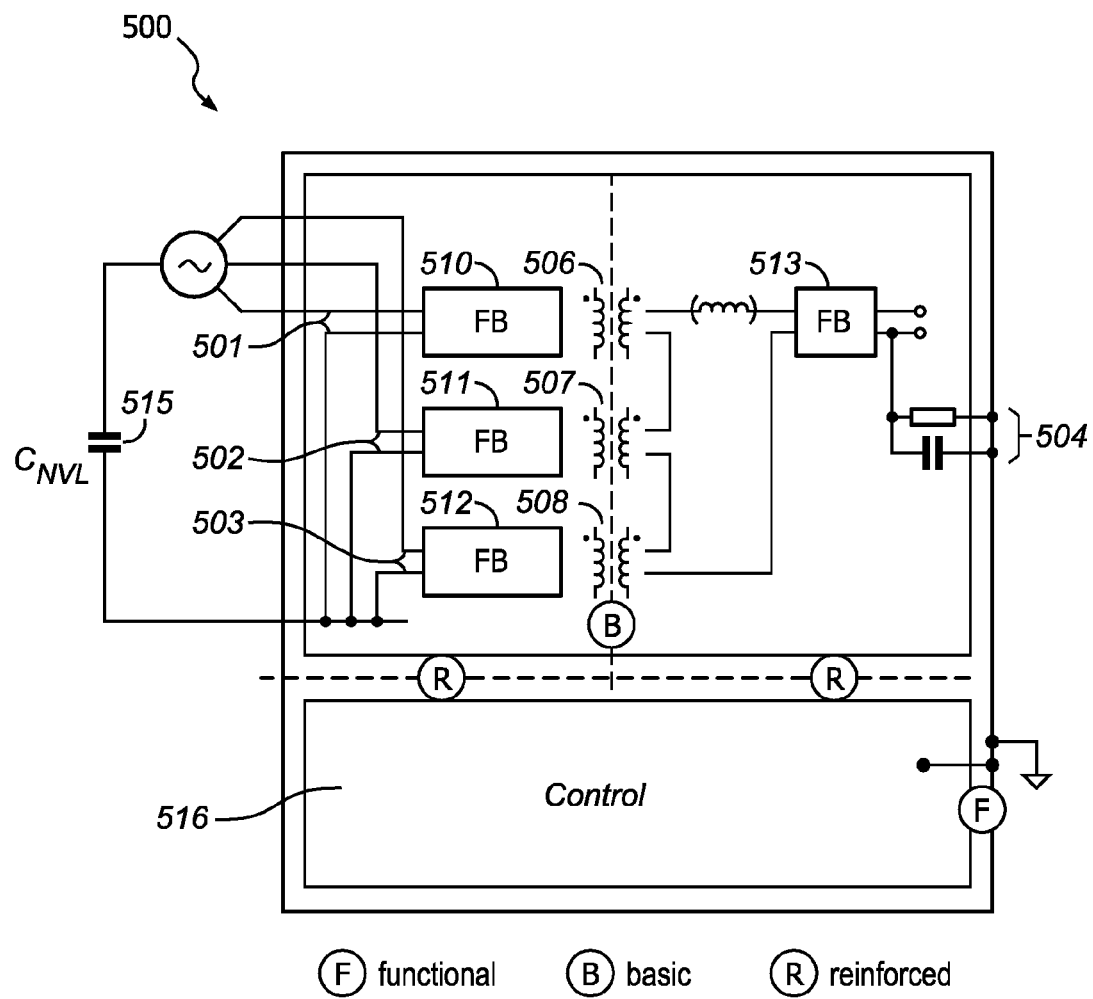
FIG. 5 schematically shows an embodiment of the invention with two or more AC side ports coupled to one or more DC side ports.

According to an embodiment of the invention, a bi-directional AC/DC converter 500 comprises two or more AC side ports 501, 502, 503 coupled to one or more DC side ports 504, see FIG. 5. The AC/DC converter 500 also comprises a number of transformers 506, 507, 508 for each AC side port and possibly a series inductor (indicated with brackets). For each port a number of full bridges or half bridges 510, 511, 512, 513 (indicated with FB), which generate alternating voltages fed to the transformers 506, 507, 508. A neutral voltage lift capacitor 515 (indicated with CNVL) is arranged between the neutral line of the AC side and a common node of the bridges 510, 511, 512. A control block 516 is arranged to drive one or more parts of the topology. And, optionally, some isolation barriers F, B and R of a certain rating between one or more parts of the topology, see FIG. 5.

FIG. 6 schematically shows a bi-directional AC/DC converter 600 according to a further embodiment, where the converter 600 comprises four AC terminals R, S, T and N. The terminals R, S and T each are coupled to a half active bridge, see 606, 607 and 608. Switchable nodes of the half active bridges 606, 607, 608 are connected to a switchable node of a DC side half bridge 610 via respective inductors 616, 617 and 618. Similar to FIG. 2, the DC side has two terminals and a capacitor 23 arranged between the DC terminals 21, 22 and across the output of the half active bridge 610. A controller 620 is arranged to control the switches of the half active bridges.

As compared to the embodiment of FIG. 2, the converter 600 is a non-isolating AC/DC converter. Still the inverter has the advantage of a wider output voltage range as compared to the known converters. Furthermore no HV buffer capacitor is needed.

FIG. 7 schematically shows a bi-directional AC/DC converter 700 according to a further embodiment, where the converter 700 comprises a two AC terminals R and N. The terminal R is coupled to a full active bridge 702. Switchable nodes of the full active bridge 702 are connected to switchable nodes of a DC side full active bridge 703 via a transformer 704 and an optional inductor 706. Similar to the converter of FIG. 2, the AC/DC converter 700 comprises a neutral voltage lift capacitor 705 arranged to lift the AC voltage VR. Also a controller 720 is present which is arranged to control the switches of the active bridges in a way similar as described above with reference to FIG. 2.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A bi-directional AC to DC converter, comprising:
   a first AC terminal for connection to a first AC circuit terminal;
   a neutral line terminal for connection to a neutral AC circuit terminal
   a common node;
   a first AC side active bridge coupled between the first AC terminal) and the common node;
   a neutral voltage lift capacitor coupled between the neutral line terminal and the common node;
   a first DC terminal;
   a second DC terminal;
   a buffer capacitor arranged between the first DC terminal and the second DC terminal;
   a DC-side active bridge coupled between the first DC terminal and the second DC terminal;
   a first inductor coupled between a switchable node of the first AC side active bridge and a switchable node of the DC side active bridge;
   a controller arranged to control the first AC side active bridge and the DC-side active bridge so that an alternating voltage across the first AC terminal and the neutral line terminal is converted to and from a direct voltage across the first DC terminal and the second DC terminal;
   a second AC terminal for connection to a second AC circuit terminal;
   a second AC side active bridge coupled between the second AC terminal and the common node;
   a second inductor coupled between a switchable node of the second AC side active bridge and a switchable node of the DC side active bridge;
   a third AC terminal for connection to a third AC circuit terminal;
   a third AC side active bridge coupled between the third AC terminal and the common node;
   a third inductor coupled between a switchable node of the third AC side active bridge and the switchable node of the DC side active bridge;
   the controller being arranged to control the first AC side active bridge, the second AC side active bridge, the third AC side active bridge and the DC-side active bridge so that a three phase alternating voltage at the first, second and third AC terminal is converted to and from the direct voltage across the first DC terminal and the second DC terminal.

2. The bi-directional AC to DC converter according to claim 1, wherein the AC to DC converter further comprises:
   a first transformer coupled between the first AC side active bridge and the DC-side active bridge so as to electrically isolate the first AC side active bridge from the DC-side active bridge.

3. The bi-directional AC to DC converter according to claim 2, wherein the AC to DC converter comprises a further inductor arranged in series with a DC side coil of the first transformer.

4. The bi-directional AC to DC converter according to claim 1, wherein the AC to DC converter further comprises:
   a first transformer coupled between the first AC side active bridge and the DC-side active bridge so as to electrically isolate the first AC side active bridge from the DC-side active bridge;
   a second transformer coupled between the second AC side active bridge and the DC-side active bridge so as to electrically isolate the second AC side active bridge from the DC-side active bridge;
   a third transformer coupled between the third AC side active bridge and the DC-side active bridge so as to electrically isolate the third AC side active bridge from the DC-side active bridge.

* * * * *